(12) United States Patent
Baralon

(10) Patent No.: US 8,757,965 B2
(45) Date of Patent: Jun. 24, 2014

(54) GAS TURBINE COMPRESSION SYSTEM AND COMPRESSOR STRUCTURE

(75) Inventor: Stephane Baralon, Derby (GB)

(73) Assignee: Volvo Aero Corporation, Trollhattan (SE)

( * ) Notice: Subject to any disclaimer, the term of this patent is extended or adjusted under 35 U.S.C. 154(b) by 371 days.

(21) Appl. No.: 10/908,970

(22) Filed: Jun. 2, 2005

(65) Prior Publication Data

US 2006/0275110 A1  Dec. 7, 2006

Related U.S. Application Data

(60) Provisional application No. 60/521,596, filed on Jun. 1, 2004.

(51) Int. Cl.
*F01D 9/04* (2006.01)
(52) U.S. Cl.
USPC ........... 415/142; 415/191; 415/193; 415/194; 415/195; 415/209.1; 415/211.2; 415/199.5; 60/226.1
(58) Field of Classification Search
USPC ............. 415/191, 193, 194, 195, 142, 208.2, 415/209.1, 211.2, 199.5; 60/226.1
See application file for complete search history.

(56) References Cited

U.S. PATENT DOCUMENTS

| | | | | |
|---|---|---|---|---|
| 2,870,958 A | * | 1/1959 | Pinsley | 415/195 |
| 2,937,491 A | * | 5/1960 | Howell | 60/246 |
| 3,169,747 A | * | 2/1965 | Seymour | 415/195 |
| 3,314,649 A | * | 4/1967 | Erwin et al. | 415/176 |
| 3,652,184 A | * | 3/1972 | Conrad | 415/208.2 |
| 5,088,892 A | * | 2/1992 | Weingold et al. | 415/193 |
| 5,102,298 A | * | 4/1992 | Kreitmeier | 415/211.2 |
| 5,224,341 A | * | 7/1993 | Munroe et al. | 60/226.1 |
| 5,284,011 A | * | 2/1994 | Von Benken | 60/796 |
| 5,397,215 A | * | 3/1995 | Spear et al. | 415/191 |
| 5,478,199 A | * | 12/1995 | Gliebe | 415/119 |
| 6,312,219 B1 | * | 11/2001 | Wood et al. | 415/191 |
| 6,375,419 B1 | * | 4/2002 | LeJambre et al. | 415/191 |
| 6,439,838 B1 | * | 8/2002 | Crall et al. | 415/194 |
| 6,457,938 B1 | * | 10/2002 | Liu et al. | 415/160 |
| 6,681,558 B2 | * | 1/2004 | Orlando et al. | 60/204 |
| 6,789,998 B2 | * | 9/2004 | Chen et al. | 415/208.2 |
| 6,905,303 B2 | * | 6/2005 | Liu et al. | 415/142 |
| 2005/0141989 A1 | * | 6/2005 | Sayegh et al. | 415/116 |

* cited by examiner

*Primary Examiner* — Christopher Verdier
(74) *Attorney, Agent, or Firm* — Novak Druce Connolly Bove + Quigg LLP

(57) ABSTRACT

A gas turbine compression system (1) comprising a gas channel (5), a low pressure compressor section (8) and a high pressure compressor section (9) for compression of the gas in the channel and a compressor structure (14) arranged between the low pressure compressor section (8) and the high pressure compressor section (9). The compressor structure (14) is designed to conduct a gas flow in the gas channel and comprises a plurality of radial struts (15,16,21,24,25) for transmission of load, wherein at least one of the struts (15, 16,21,24,25) is hollow for housing service components. The compressor structure (14) is arranged directly downstream of a last rotor (10) in the low pressure compressor section (8) and designed for substantially turning a swirling gas flow from the rotor (10) by a plurality of the struts (15,16,21,24,25) having a cambered shape.

13 Claims, 5 Drawing Sheets

GAS TURBINE COMPRESSION SYSTEM AND COMPRESSOR STRUCTURE

CROSS-REFERENCE TO RELATED APPLICATIONS

The present application claims the benefit of U.S. Provisional Application No. 60/251,596 filed 1 Jun. 2004. Said application is expressly incorporated herein by reference in its entirety.

FIELD OF THE INVENTION

The present invention relates to a gas turbine compression system comprising a gas channel, a low pressure compressor section and a high pressure compressor section for compression of the gas in the channel and a compressor structure arranged between the low pressure compressor section and the high pressure compressor section, the compressor structure being designed to conduct a gas flow in the gas channel and comprises a plurality of radial struts for transmission of load, wherein at least one of said struts is hollow for housing service components. The invention also relates to the compressor structure.

The gas turbine compression system forms part of a gas turbine engine. The gas turbine compression system is in the gas turbine engine driven by a turbine system via engine shafts. The gas turbine engine is especially intended for an aircraft jet engine. Jet engine is meant to include various types of engines, which admit air at relatively low velocity, heat it by combustion and shoot it out at a much higher velocity. Accommodated within the term jet engine are, for example, turbojet engines and turbo-fan engines. The invention will below be described for a turbo-fan engine, but may of course also be used for other engine types.

The structural strength of the gas turbine engine hinges upon a limited number of engine structures, also known as cases. The structures therefore represent the skeleton of the engine. The structures are highly loaded during operation of the engine. The structures usually comprise a bearing house for the engine shafts, a gas flow channel in the form of an annular duct and radial struts which form the link between the inner and outer parts of the engine. The inventive compressor structure forms such a structure.

The struts are often hollow in order to house service components such as means for the intake and outtake of oil and/or air, for housing instruments, such as electrical and metallic cables for transfer of information concerning measured pressure and/or temperature etc. The struts normally have a symmetric airfoil shape in cross section in order to effect the gas flow as little as possible. The servicing requirement usually governs the number of struts required.

SUMMARY OF THE INVENTION

A primary object of the invention is to reduce the number of parts in the gas turbine compression system.

This object is achieved in that the compressor structure is arranged directly downstream a last rotor in the low pressure compressor section and designed for substantially turning a swirling gas flow from said rotor by a plurality of said struts having a cambered shape. With "substantially turning" is meant a turning of the gas flow with at least 20°. Further, the swirling gas flow is turned to a direction with a dominant component in the axial direction. The compressor structure may be designed for turning the gas flow to a direction substantially parallel to the engine rotational axis.

In traditional gas turbine compression systems there is a last stator row between the last rotor in the low pressure compressor section and the struts. This last stator row comprises a plurality of aerodynamic vanes (in many cases about 150 vanes) designed for turning the swirling gas flow from the last rotor in said low pressure compressor section to a substantially axial direction. By virtue of the invention, the last stator row may be removed. In other words, according to the invention, the function of the last stator row and the function of a conventional compressor structure with struts is replaced by the inventive compressor structure.

Further, a conventional compressor structure comprising struts with a symmetrical airfoil shape has a very limited aerodynamic function. This represents a "dead-weight" from an aerodynamic viewpoint. The conventional compressor structure is essentially a penalty on pressure loss. Furthermore, the length of the gas flow channel through the compressor structure is usually governed by the aerodynamic constraint of a mild axial-radial flow turning to avoid boundary layer separation or by the bearing-house size. Each of these two constraints leads to a rather long gas flow channel which impacts on the engine length without taking much advantage of the available component length from an aerodynamical viewpoint. By, according to the invention, using struts with a substantial aerodynamic shape, the aero-functionality of the compressor structure is therefore not expected to have a detrimental impact on the required total engine length.

In other words, according to the invention, the available axial length of the compressor structure, which is governed by engine overall layout and aerodynamic constraints, is used to integrate the upstream stator row aerodynamic functionality into the compressor structure with struts.

While reducing the number of engine parts, it is possible to reduce or at least not increase the flow distortion for the downstream high pressure compressor rotor and upstream low pressure compressor rotor.

In order to achieve the substantial turning of the gas flow, the direction of a mean chamber line at the leading edge of at least one of the cambered struts is inclined at least 20° in relation to the direction of the mean chamber line at the trailing edge of said cambered strut.

According to a preferred embodiment of the invention, the thickness to chord ratio of at least one of the cambered struts is about 0.10 (+/−0.05). This ratio may be optimized with regard to the number of aerodynamic vanes and struts. This creates conditions for a larger cross section area of each strut. An increased cross section area results in an increased structural strength and servicing capability per strut. This, in turn leads to the option of reducing the total number of load-bearing struts and/or increasing the total servicing capability of the compressor structure.

According to a further development, the compressor structure comprises a plurality of aerodynamic vanes with a substantially smaller cross section area relative to the struts. These smaller aerodynamic vanes may be arranged to assist the struts in turning the flow. The aerodynamic vanes may as a complement/alternative be arranged for creating an advantageous pressure distribution around the struts.

According to a further development, said struts are asymmetrically distributed in the circumferential direction of the compressor structure. This creates conditions to distribute the struts for optimal structural strength.

BRIEF DESCRIPTION OF THE DRAWINGS

The invention will be explained below, with reference to the embodiment shown on the appended drawings, wherein.

DETAILED DESCRIPTION

Figure 1:
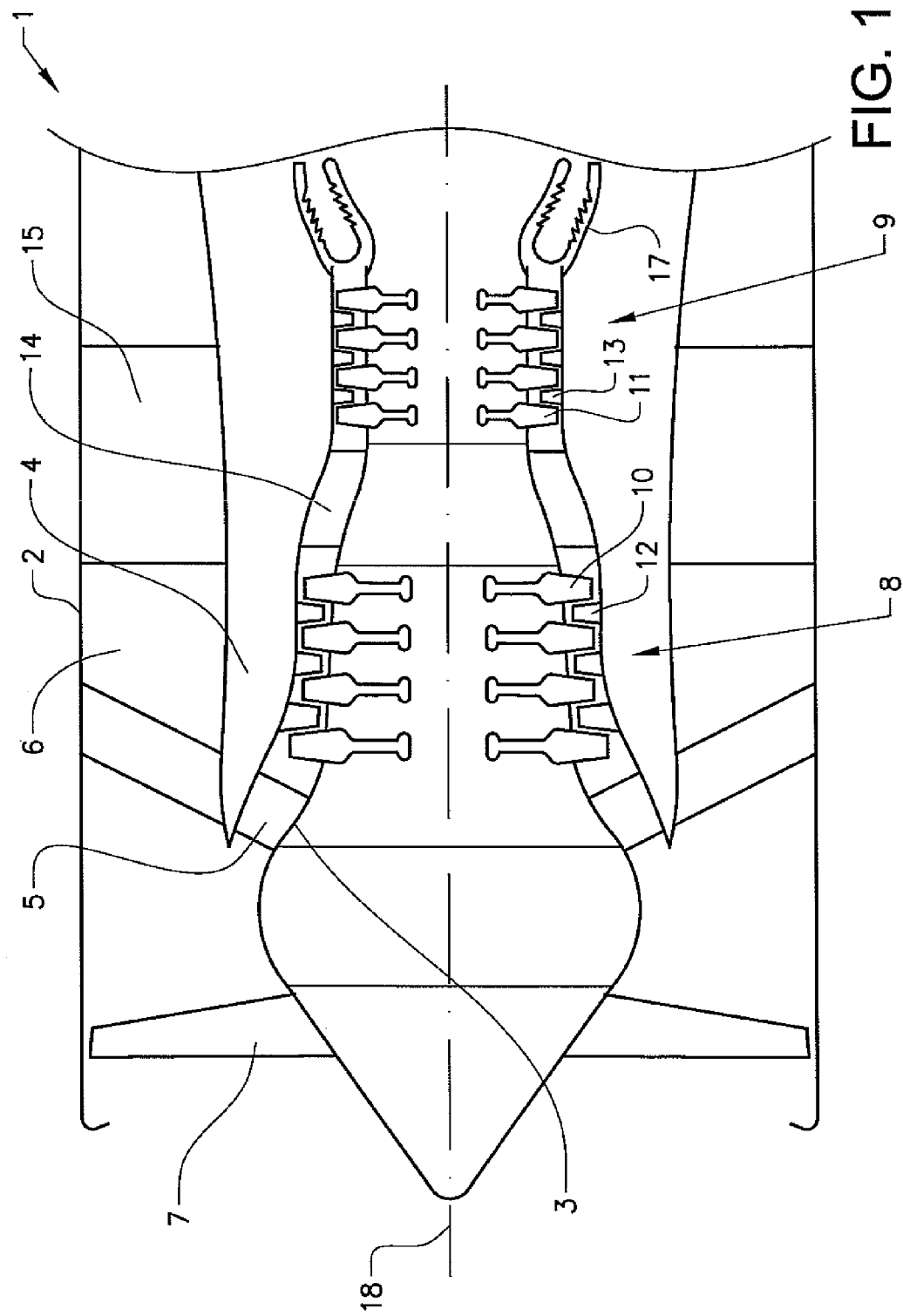
FIG. 1 is a schematic side view of the engine cut along a plane in parallel with the rotational axis of the engine.
Figure 2:
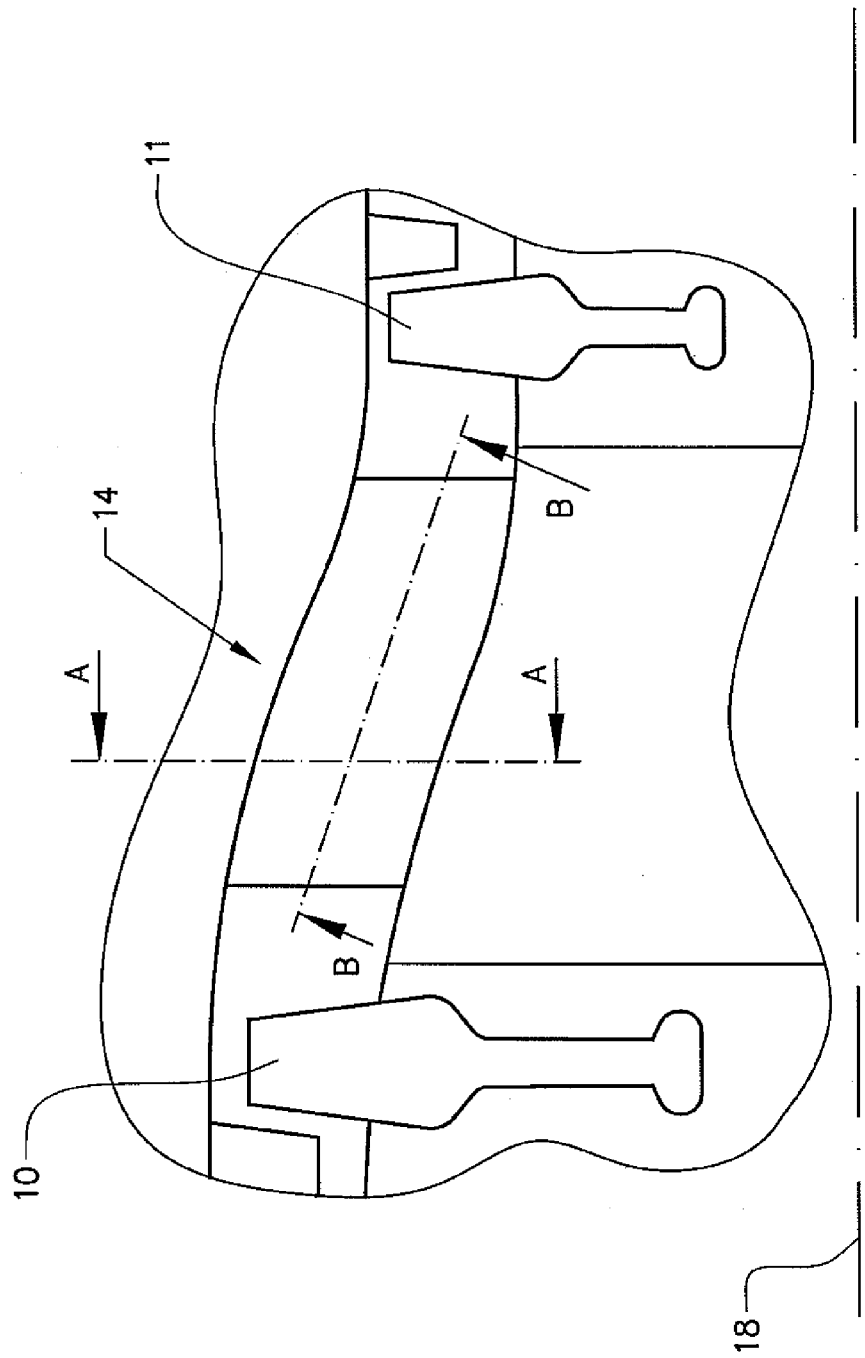
FIG. 2 is an enlarged view of the compressor structure between the low pressure compressor section and the high pressure compressor section from FIG. 1.

The invention will below be described for a high bypass ratio aircraft engine 1, see FIG. 1. The engine 1 comprises an outer housing 2, an inner housing 3 and an intermediate housing 4 which is concentric to the first two housings and divides the gap between them into an inner primary gas channel 5 for the compression of the propulsion gases and a secondary channel 6 in which the engine bypass circulates. Thus, each of the gas channels 5,6 is annular in a cross section perpendicular to an axial direction 18 of the engine 1. A fan 7 is arranged at the engine intake upstream of the inner and outer gas channels 5,6.

The engine 1 comprises a low pressure compressor section 8 and a high pressure compressor section 9 for compression of the gas in the primary gas channel 5. A combustion chamber 17 is arranged downstream of the high pressure compressor section 9 for combustion of the compressed gas from the primary gas channel 5. The aircraft engine 1 further comprises turbine sections (not shown) for expansion of the propulsion gases arranged downstream of the combustion chamber in a way known in the art.

Each of the compressor sections 8,9 comprises a plurality of rotors 10,11 and stators 12, 13, arranged between two adjacent rotors. The stators 12,13 comprises a plurality of aerodynamic vanes for turning a swirling gas flow from an upstream rotor to a substantially axial direction.

The housings 2,3,4 are supported by structures 14, 15 which connect the housings by radial arms. These arms are generally known as struts. The struts must be sufficiently resistant to provide this support and not to break or buckle in the event of a fan blade coming loose and colliding with them. Further, the struts are designed for transmission of loads in the engine. Further, the struts are hollow in order to house service components such as means for the intake and outtake of oil and/or air, for housing instruments, such as electrical and metallic cables for transfer of information concerning measured pressure and/or temperature, a drive shaft for a start engine etc. The struts can also be used to conduct a coolant.

The compressor structure 14 connecting the intermediate housing 4 and the inner housing 3 is conventionally referred to as an Intermediate Case (IMC) or Intermediate Compressor Case (ICC). The compressor structure 14 is designed for guiding the gas flow from the low pressure compressor section 8 radially inwards toward the high pressure compressor section inlet. The compressor structure 14 connecting the intermediate housing 4 and the inner housing 3 comprises a plurality of radial struts 15,16,21,24,25 see FIGS. 3 and 4, at mutual distances in the circumferential direction of the compressor structure 14. These struts 15,16 are structural parts, designed for transmission of both axial and radial loads and are hollow in order to house service components.

The compressor structure 14 is designed for turning a swirling gas flow from the rotor 10 to a substantially axial direction. Thus, the compressor structure 14 is arranged directly downstream the last rotor 10 in the low pressure compressor section 8. Further, the compressor structure 14 is arranged directly upstream the first rotor 11 in the high pressure compressor section 9. The swirling gas from the rotor 10 normally flows with an angle of 40-60° relative to the axial direction 18 of the engine. The struts 15,16 are arranged directly downstream the last rotor 10 in the low pressure compressor section 8. In this case the turning of the gas flow is in the combined axial-tangential and axial-radial directions.

The magnitude of the turning of the gas flow in the compressor structure section 14 depends on several parameters. In order to accomplish a turning of the gas flow in the magnitude of 40-60°, the struts 15,16,21,24,25 have a cambered airfoil shape, see FIGS. 4 and 5. In other words, the struts are designed with a sufficient curvature for a substantial turning of the gas flow. Hence, the struts 15,16,21,24,25 are not only structural, but also aerodynamic. More specifically, the direction of a mean chamber line M at the leading edge 101 of the cambered strut 16 is inclined with an angle in relation to the direction of the mean chamber line M at the trailing edge 102 of the cambered strut corresponding to the desired turning angle. The direction of the mean chamber line M at the leading edge 101 of the cambered strut 16 is therefore inclined with at least 20°, suitably at least 30°, especially at least 40°, and preferably at least 50° in relation to the direction of the mean chamber line M at the trailing edge 102 of the cambered strut.

In order to achieve the turning of the gas flow in the magnitude of 40-60°, the struts are further designed with a longer chord in comparison with conventional struts. The chord is defined as the distance between a leading edge 101 and a trailing edge 102 of the vane 15 along the chord line C, see FIG. 5. The chord line C is defined as a straight line connecting the leading edge 101 and the trailing edge 102. More specifically, the chord of the cambered struts 15,16,21,24,25 is at least six times, suitably at least seven times, preferably at least eight times and according to a preferred example about nine times the thickness of said cambered strut. The thickness of the strut may, on the other hand be about the same as in conventional struts.

The thickness of the strut is defined as the maximum distance between the two opposing strut surfaces 103,104 in a direction perpendicular to a mean chamber line M. The mean chamber line M is defined as the locus of points halfway between the upper and lower surfaces of the strut as measured perpendicular to the mean camber line itself. The camber A is defined as the maximum distance between the mean chamber line M and the chord line C measured perpendicular to the chord line. According to the invention, the chord of the strut is substantially longer than the chord of conventional struts.

Further, the maximum thickness to chord ratio is another measure for the gas flow turning capacity of the struts. The maximum thickness is preferably less than 20%, especially less than 15% and more specifically about 10% of the chord according to the example shown in the drawings.

Figure 3:
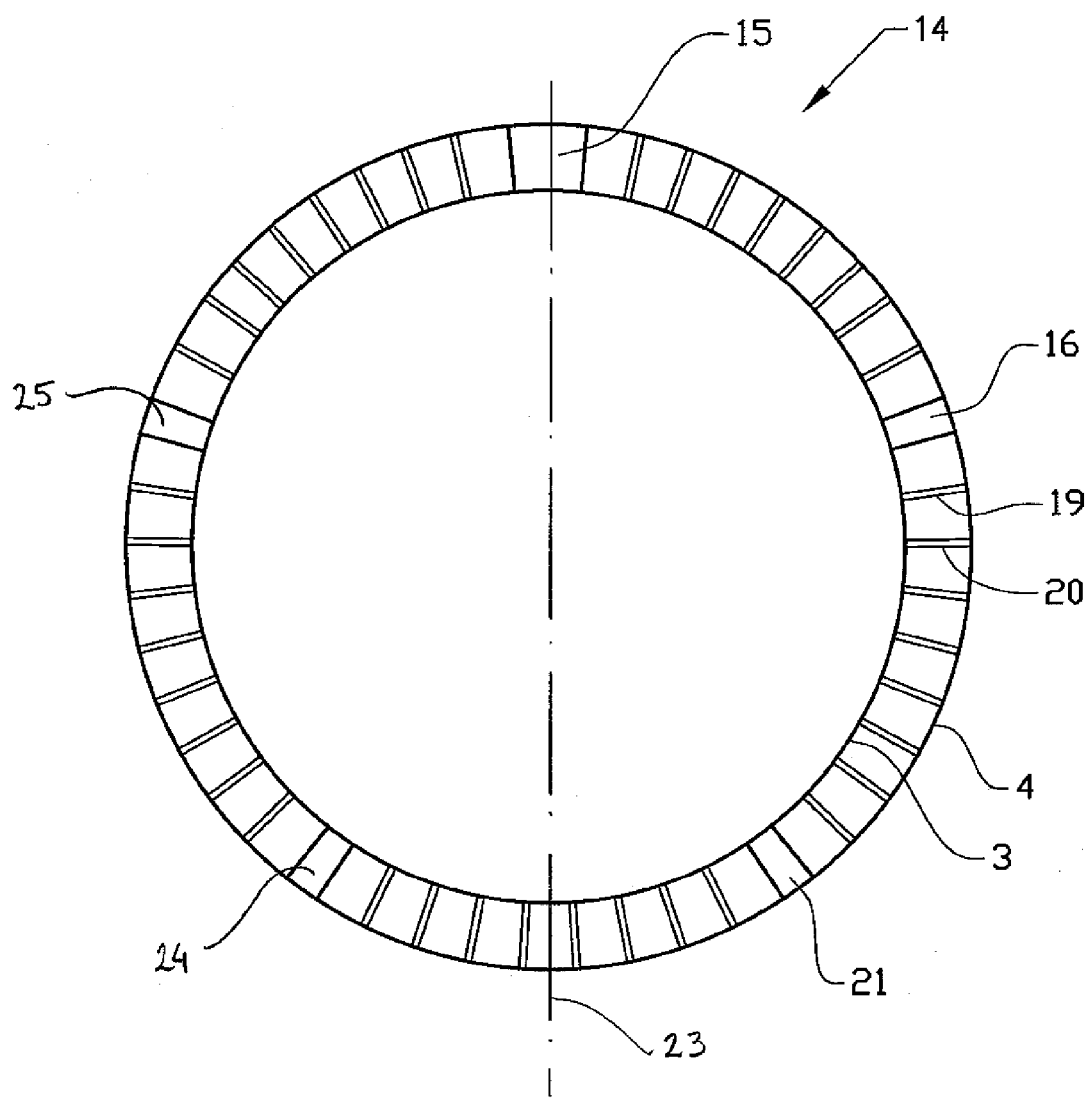
FIG. 3 is a cross section view along A-A in FIG. 2.

The struts 15,16,21,24,25 are further asymmetrically distributed in the circumferential direction of the annular compressor structure 14, see FIG. 3, for optimal structural strength. A first 15 of said struts is arranged at the highest possible vertical position in the compressor structure gas channel. The first strut 15 has a somewhat larger thickness than the other struts 16,21,24,25 in order to receive a radial drive shaft for a start engine. The further struts 16,21 and 24,25, respectively, are symmetrically distributed with regard to a plane 23 coinciding with the first strut 15 and in parallel with the axial direction 18 of the gas turbine compression system. More specifically, two struts 16,21 and 24,25, respectively, are arranged on each side of the symmetry plane 23.

A plurality of so-called aerodynamic vanes, or splitter vanes, 19,20 are arranged between the struts 15,16,21,24,25. The aerodynamic vanes 19,20 are thus arranged in said compressor structure 14 forming a single circular cascade with the struts. The aerodynamic vanes are substantially smaller and lighter than the struts and are non-bearing from a structural viewpoint. The struts are far fewer in number than the aerodynamic vanes.

The aerodynamic vanes 19,20 are arranged for assisting the struts in turning the gas flow from the rotor 10 to a substantially axial direction.

The splitter vanes 19,20 are placed and staggered to reduce the risk for forcing from the strut potential flow on the upstream rotor row. The strut profiles are also optimised to reduce the upstream influence of the strut potential flow on the upstream rotor through the choice of suitable leading-edge radii and wedge-angles.

Furthermore, the splitter vanes 19,20, which have no structural bearing function, can also be swept in the chordwise, leaned or even bowed in the cross-chordwise directions to reduce the intensity of the secondary flow, such as horseshoe and passage vortices, by controlling the flow and pressure gradients in the low aspect ratio strut passages.

The need for splitter vanes to reduce the number of struts also allows for the introduction of said asymmetric strut placement in the IMC/ICC duct in the circumferential direction, see FIG. 3. Indeed, the struts are located to take the structural loads and especially, the engine mount loads in an optimal way from a structural viewpoint. The splitter vanes 19,20 are consequently distributed to yield a homogeneous deswirling of the flow despite the asymmetric distribution of the struts.

In the description above, the engine rotational axis and the axial direction of the engine/gas turbine compression system/compressor structure refers to the same axis 18.

The invention is not in any way limited to the above described embodiments, instead a number of alternatives and modifications are possible without departing from the scope of the following claims.

Figure 4:
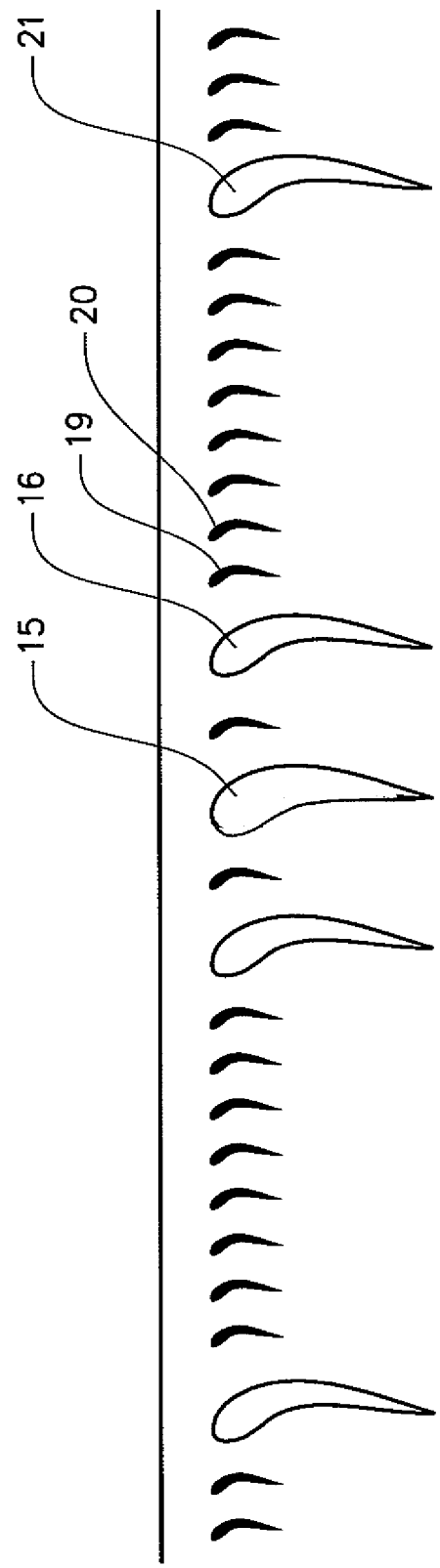
FIG. 4 is a developed cross section view along B-B in FIG. 2.
Figure 5:
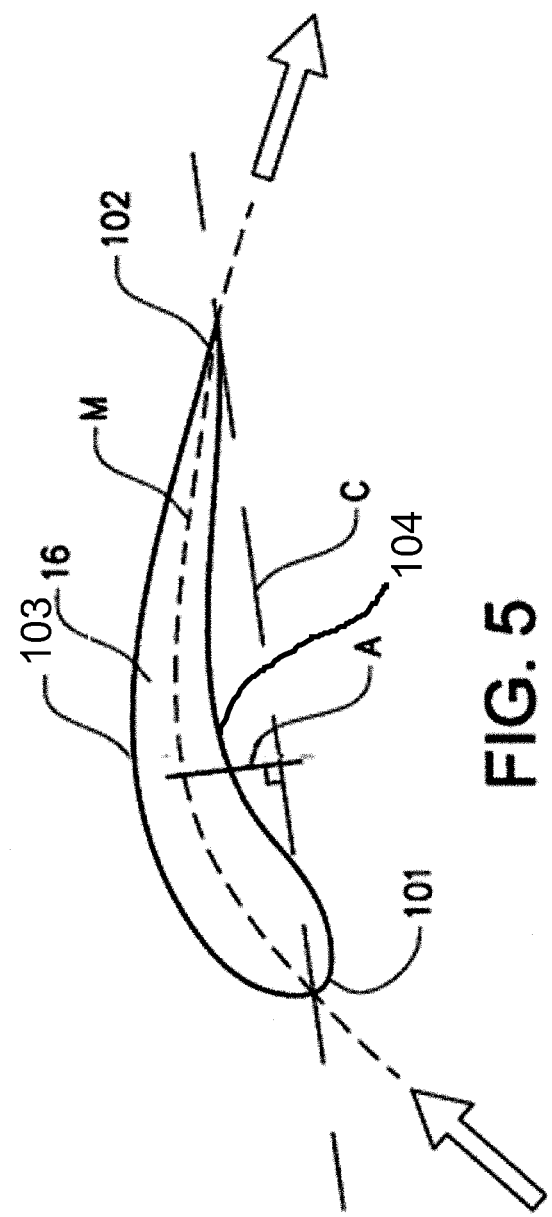
FIG. 5 is an enlarged cross section view of one of the struts from FIG. 4.

For example, the arrangement of the smaller aerodynamic vanes (splitter vanes) in FIG. 4 is only an illustration of a possible configuration and is thereby not exhaustive as to how the splitter vanes may be located in the axial, radial and tangential directions with regard to the struts. As an example, an aerodynamic vane may be arranged at the trailing edge of a specific strut forming a type of flap for enhancing the gas flow turning capacity of the strut.

As an alternative to being solid, said aerodynamic vanes may be hollow in cross section, ie at least comprise a substantial void/cavity, however not necessarily a through-going hole.

According to an alternative embodiment, the compressor structure may be designed for turning the gas flow to a direction different from the axial direction. The compressor structure may for example be designed for turning the gas flow from an incoming direction of +50° to an outgoing direction of −10°. The maximum gas flow turning capacity of the compressor structure may be about 60-70°.

What is claimed is:

1. A gas turbine compression system (1), comprising:
   a gas channel (5),
   a low pressure compressor section (8) and a high pressure compressor section (9) for compression of gas in the channel, the low pressure compressor section (8) comprising an alternating series of rotating rotor blades and stationary stator blades with the last blades in the series being rotor blades, and
   a compressor structure (14) arranged between the low pressure compressor section (8) and the high pressure compressor section (9),
   wherein the compressor structure (14) is designed to conduct a gas flow in the gas channel and comprises a plurality of radial struts (15, 16, 21, 24, 25) for transmission of load, with the struts being spaced by a distance downstream from the last low-pressure-compressor rotor blades in the series with no intervening stator blades therebetween,
   wherein at least one of said struts is hollow for housing service components, and
   wherein the compressor structure (14) is designed for substantially turning a swirling gas flow from the last low-pressure-compressor rotor blades in the series by virtue of a plurality of said struts (15, 16, 21, 24, 25) having a cambered shape.

2. The gas turbine compression system according to claim 1, wherein the direction of a mean camber line (M) at the leading edge (101) of at least one of the cambered struts (15, 16, 21, 24, 25) is inclined by at least 20° in relation to the direction of the mean camber line (M) at the trailing edge (102) of said cambered strut.

3. The gas turbine compression system according to claim 1, wherein the direction of a mean camber line (M) at the leading edge (101) of at least one of the cambered struts (15, 16, 21, 24, 25) is inclined by at least 30° in relation to the direction of the mean camber line (M) at the trailing edge (102) of said cambered strut.

4. The gas turbine compression system according to claim 1, wherein the direction of a mean camber line (M) at the leading edge (101) of at least one of the cambered struts (15, 16, 21, 24, 25) is inclined by at least 40° in relation to the direction of the mean camber line (M) at the trailing edge (102) of said cambered strut.

5. The gas turbine compression system according to claim 1, wherein the thickness to chord ratio of at least one of the cambered struts (15, 16, 21, 24, 25) is about 0.10.

6. The gas turbine compression system according to claim 1, wherein the struts (15, 16, 21, 24, 25) are arranged so that the leading edge (101) of each of them is located at substantially the same position in a direction parallel to the rotational axis (18) of the gas turbine compression system.

7. The gas turbine compression system according to claim 1, wherein the compressor structure (14) comprises a plurality of aerodynamic vanes (19, 20) with a substantially smaller cross section area relative to the struts (15, 16, 21, 24, 25).

8. The gas turbine compression system according to claim 7, wherein at least one of said aerodynamic vanes (19, 20) is located between two adjacent struts (16,21) in the circumferential direction of the compressor structure (14).

9. The gas turbine compression system according to claim 7, wherein a leading edge of each of a first set of said aerodynamic vanes (19, 20) is arranged at substantially the same position as the leading edge of the struts (15, 16, 21, 24, 25) in a direction parallel to the rotational axis (18) of the gas turbine compression system.

10. The gas turbine compression system according to claim 7, wherein at least one of said aerodynamic vanes (19, 20) is substantially solid in cross section.

11. The gas turbine compression system according to claim 1, wherein said struts (15, 16, 21, 24, 25) are asymmetrically distributed in the circumferential direction of the compressor structure.

12. The gas turbine compression system according to claim 1, wherein said struts (15, 16, 21, 24, 25) are symmetrically distributed with regard to a plane in parallel with the axial direction of the gas turbine compression system.

13. The gas turbine compression system according to claim 1, wherein the compressor structure (14) is arranged directly upstream a first rotor (11) in the high pressure compressor section.

* * * * *